(12) United States Patent
Kim (10) Patent No.: US 11,498,433 B2
(45) Date of Patent: Nov. 15, 2022

(54) MOTOR SYSTEM CONTROL APPARATUS FOR VEHICLES AND MOTOR SYSTEM CONTROL METHOD THEREOF

(71) Applicants: HYUNDAI MOTOR COMPANY, Seoul (KR); KIA MOTORS CORPORATION, Seoul (KR)

(72) Inventor: Yong Hyun Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 485 days.

(21) Appl. No.: 16/828,480

(22) Filed: Mar. 24, 2020

(65) Prior Publication Data

US 2021/0178908 A1 Jun. 17, 2021

(30) Foreign Application Priority Data

Dec. 12, 2019 (KR) .................. 10-2019-0165704

(51) Int. Cl.
*B60L 15/32* (2006.01)
*B60K 1/02* (2006.01)
*B60L 58/12* (2019.01)

(52) U.S. Cl.
CPC .............. *B60L 15/32* (2013.01); *B60K 1/02* (2013.01); *B60L 58/12* (2019.02)

(58) Field of Classification Search
CPC ............ B60L 15/32; B60L 58/12; B60K 1/02
See application file for complete search history.

(56) References Cited

U.S. PATENT DOCUMENTS

| 9,889,843 | B2* | 2/2018 | Kim ...................... B60W 10/02 |
| 2009/0198439 | A1* | 8/2009 | Ochiai ................... B60K 6/445 |
| | | | 701/112 |
| 2009/0255744 | A1* | 10/2009 | Kitano ................... B60K 6/365 |
| | | | 180/65.285 |
| 2010/0006360 | A1* | 1/2010 | Kishimoto ............. B60K 6/547 |
| | | | 180/65.21 |

(Continued)

FOREIGN PATENT DOCUMENTS

JP 2019187061 A * 10/2019

*Primary Examiner* — Brian L Swenson
(74) *Attorney, Agent, or Firm* — McDonnell Boehnen Hulbert & Berghoff LLP (57) ABSTRACT

Disclosed is a motor system control apparatus for vehicles including a communication unit communicatively connected to a plurality of motor systems and a controller configured to, upon recognizing that one of the motor systems is broken, control the motor system such that a battery is charged using counter-electromotive force of a motor, wherein the controller confirms whether, upon recognizing breakdown of the motor system, the broken motor system is capable of generating counter-electromotive force, decides whether to generate the counter-electromotive force based on a state of charge (SOC) and a traveling state of a vehicle upon confirming that the broken motor system is capable of generating the counter-electromotive force, controls the broken motor system such that the counter-electromotive force is generated upon deciding to generate the counter-electromotive force, and charges the battery with electrical energy generated by the counter-electromotive force.

20 Claims, 6 Drawing Sheets

(56) References Cited

U.S. PATENT DOCUMENTS

| | | | |
|---|---|---|---|
| 2010/0152940 A1* | 6/2010 | Mitsutani | B60W 10/08 180/65.23 |
| 2010/0244558 A1* | 9/2010 | Mitsutani | B60L 3/0038 307/9.1 |
| 2017/0028837 A1* | 2/2017 | Welschoff | B60L 58/12 |
| 2017/0096135 A1* | 4/2017 | Kishimoto | B60L 50/51 |
| 2021/0138957 A1* | 5/2021 | Peng | B60L 15/2045 |

\* cited by examiner

MOTOR SYSTEM CONTROL APPARATUS FOR VEHICLES AND MOTOR SYSTEM CONTROL METHOD THEREOF

CROSS REFERENCE TO RELATED APPLICATIONS

This application claims the benefit of Korean Patent Application No. 10-2019-0165704, filed on Dec. 12, 2019, which is hereby incorporated by reference as if fully set forth herein.

BACKGROUND

Field

The present disclosure relates to a motor system control apparatus for vehicles, and more particularly to a motor system control apparatus for vehicles capable of increasing a traveling distance in a limp-home traveling mode upon diagnosing breakdown of a motor system and a motor system control method thereof.

Discussion of the Related Art

In general, a hybrid electric vehicle (HEV), an electric vehicle (EC), a fuel cell vehicle (FCV), etc. have been developed and used as a plan for improving the global environment. In particular, it is expected that development of the electric vehicle will become further prominent in the future.

In recent years, a two-motor system using two driving motors has been developed and applied to the electric vehicle.

A disconnect actuator system (DAS), which is connected to at least one of a front wheel motor or a rear wheel motor, may be applied to the two-motor system.

Here, the DAS may be configured to perform connection/disconnection between a shaft of the motor and a wheel shaft, to which wheels are connected, through a dog clutch at one of the wheels.

Since the two-motor system includes two driving motors, as described above, traveling is possible through one of the motor systems even in the case in which the other motor system is broken, whereby it may be possible to restrictively maintain driving force.

In the case in which one of the motor systems is broken, restrictive traveling is possible in a limp-home traveling mode; however, the broken motor system is not utilized, whereby efficiency is lowered.

Therefore, there is a need to develop a motor system control apparatus for vehicles capable of increasing a traveling distance in the limp-home traveling mode utilizing the broken motor system.

SUMMARY

Accordingly, the present disclosure is directed to a motor system control apparatus for vehicles and a motor system control method thereof that substantially obviate one or more problems due to limitations and disadvantages of the related art.

An object of the present disclosure is to provide a motor system control apparatus for vehicles capable of generating counter-electromotive force of a broken motor system based on the SOC and the traveling state of a vehicle and charging a battery with electrical energy generated by the counter-electromotive force, whereby it is possible to increase a traveling distance in a limp-home traveling mode utilizing the broken motor system, and a motor system control method thereof.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a motor system control apparatus for vehicles includes a communication unit communicatively connected to a plurality of motor systems and a controller configured to, upon recognizing that one of the motor systems is broken through the communication unit, control the motor system such that a battery is charged using counter-electromotive force of a motor, wherein the controller confirms whether, upon recognizing breakdown of the motor system, the broken motor system is capable of generating counter-electromotive force, decides whether to generate the counter-electromotive force based on a state of charge (SOC) and a traveling state of a vehicle upon confirming that the broken motor system is capable of generating the counter-electromotive force, controls the broken motor system such that the counter-electromotive force of the motor is generated upon deciding to generate the counter-electromotive force, and charges the battery with electrical energy generated by the counter-electromotive force of the motor.

In another aspect of the present disclosure, a motor system control method of a motor system control apparatus for vehicles, including a controller communicatively connected to a plurality of motor systems to control a broken motor system, includes the controller recognizing breakdown of the motor system, the controller confirming whether the broken motor system is capable of generating counter-electromotive force, the controller deciding whether to generate the counter-electromotive force based on a state of charge (SOC) and a traveling state of a vehicle upon confirming that the broken motor system is capable of generating the counter-electromotive force, the controller controlling the broken motor system such that counter-electromotive force of a motor is generated upon deciding to generate the counter-electromotive force, and the controller charging a battery with electrical energy generated by the counter-electromotive force of the motor.

In another aspect of the present disclosure, a computer-readable recording medium containing a program for performing the motor system control method of the motor system control apparatus for vehicles executes processes included in the motor system control method of the motor system control apparatus for vehicles.

In a further aspect of the present disclosure, a vehicle includes a plurality of motor systems and a motor system control apparatus communicatively connected to the motor systems to control a broken motor system, wherein the motor system control apparatus includes a communication unit communicatively connected to the motor systems and a controller configured to confirm whether, upon recognizing breakdown of the motor system, the broken motor system is capable of generating counter-electromotive force, to decide whether to generate the counter-electromotive force based on a state of charge (SOC) and a traveling state of a vehicle upon confirming that the broken motor system is capable of generating the counter-electromotive force, to control the broken motor system such that counter-electromotive force of a motor is generated upon deciding to generate the counter-electromotive force, and to charge a battery with electrical energy generated by the counter-electromotive force of the motor.

It is to be understood that both the foregoing general description and the following detailed description of the present disclosure are exemplary and explanatory and are intended to provide further explanation of the disclosure as claimed.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. The following embodiments are given by way of example in order to enable those skilled in the art to fully understand the idea of the present disclosure. Therefore, the present disclosure is not limited by the following embodiments, and may be realized in various other forms. In order to clearly describe the present disclosure, parts having no relation with the description of the present disclosure have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

In addition, the same reference numerals denote the same constituent elements throughout the specification.

Hereinafter, a motor system control apparatus for vehicles and a motor system control method thereof, which may be applied to embodiments of the present disclosure, will be described in detail with reference to FIGS. 1 to 6.

Figure 1:
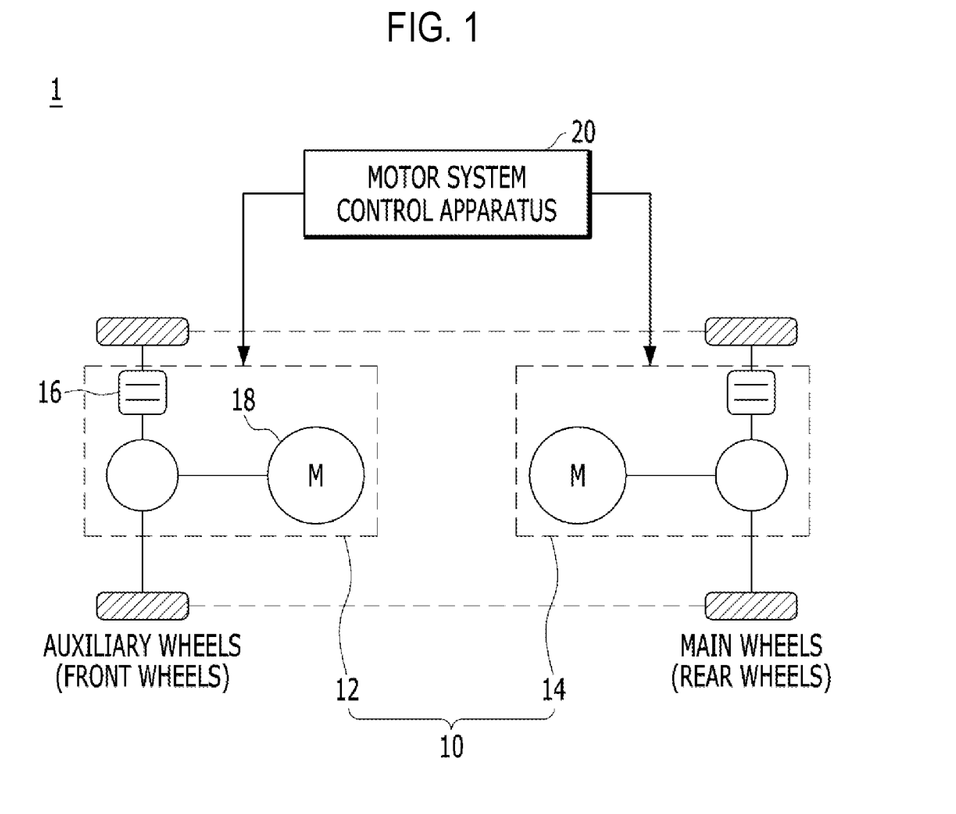
FIG. 1 is a view illustrating a vehicle having a motor system control apparatus according to an embodiment of the present disclosure.
Figure 2:
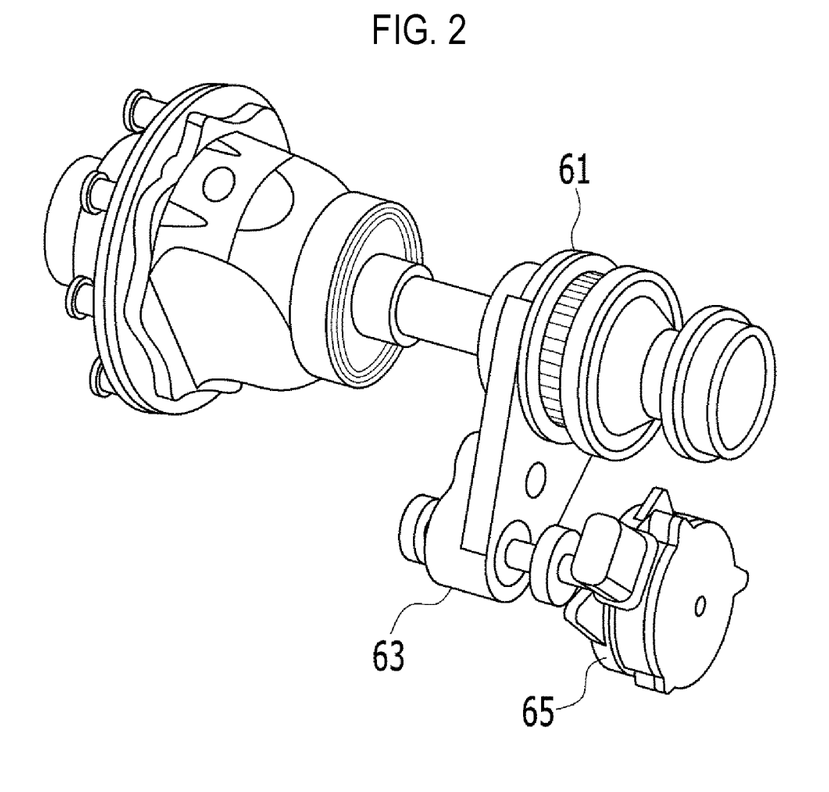
FIG. 2 is a view illustrating a disconnect actuator system (DAS) of FIG. 1.

FIG. 1 is a view illustrating a vehicle having a motor system control apparatus according to an embodiment of the present disclosure, and FIG. 2 is a view illustrating a disconnect actuator system (DAS) of FIG. 1.

As shown in FIG. 1, the vehicle 1 according to the present disclosure may include a plurality of motor systems 10 and a motor system control apparatus 20 communicatively connected to the motor systems 10 to control a broken motor system 10.

As an example, the motor systems 10 may include a front wheel motor system 12 and a rear wheel motor system 14 of the vehicle.

Here, each motor system 10 may include a motor 18 and an inverter 19 (shown in FIG. 3) configured to convert electric power that is supplied to the motor 18.

In addition, each motor system 10 may include a separate motor control unit (MCU).

At least one of the motor systems 10 may include a clutch 16 configured to perform connection/disconnection between a shaft of the motor 18 and a wheel shaft, to which wheels are connected.

Here, the clutch 16 may be a dog clutch configured to perform connection/disconnection between the shaft of the motor and the wheel shaft, to which the wheels are connected, according to a control signal of the motor system control apparatus 20; however, the present disclosure is not limited thereto.

As an example, the clutch 16 may be a dog clutch that is applied to the disconnect actuator system (DAS).

As shown in FIG. 2, the DAS may be applied to the motor system 10 of the vehicle 1, and may include a dog clutch 61, a fork 63, and an actuator 65.

Here, the dog clutch may serve to perform connection/disconnection between the shaft of the motor and the wheel shaft, to which the wheels are connected.

Next, the motor system control apparatus 20 may confirm whether, upon recognizing breakdown of the motor system 10, the broken motor system is capable of generating counter-electromotive force, may decide whether to generate the counter-electromotive force based on the state of charge (SOC) and the traveling state of the vehicle upon confirming that the broken motor system is capable of generating the counter-electromotive force, may control the broken motor system such that the counter-electromotive force of the motor 18 is generated upon deciding to generate the counter-electromotive force, and may charge a battery with electrical energy generated by the counter-electromotive force of the motor 18.

Here, the motor system control apparatus 20 may be communicatively connected to controllers of the front wheel motor system 12 and the rear wheel motor system 14, which are included in the motor systems 10.

When recognizing breakdown of the motor system 10, the motor system control apparatus 20 may monitor operation states of the motor systems 10, and may recognize breakdown of each motor system 10 based on the operation states.

Here, when recognizing breakdown of the motor system 10, the motor system control apparatus 20 may recognize breakdown of the motor system due to the motor 18 in the case in which the operation state of the motor system 10 is over-temperature of the motor 18; however, the present disclosure is not limited thereto.

Depending on circumstances, when recognizing breakdown of the motor system 10, the motor system control apparatus 20 may recognize breakdown of the motor system due to the inverter in the case in which the operation state of the motor system 10 is over-temperature of a switch of the inverter, excess of a current control error, or damage to a current sensor; however, the present disclosure is not limited thereto.

In addition, when confirming whether the broken motor system is capable of generating the counter-electromotive force, the motor system control apparatus 20 may confirm whether the clutch 16 configured to perform connection/disconnection between the shaft of the motor and the wheel shaft, to which the wheels are connected, is included in the broken motor system, and may confirm whether the broken motor system is capable of generating the counter-electromotive force upon confirming that the clutch 16 is included.

When confirming that the clutch 16 is included, however, the motor system control apparatus 20 may finish control of the broken motor system in the case in which the clutch 16 is not included. When the control of the broken motor system is finished, the motor system 10 may execute a limp-home traveling mode.

In addition, when confirming whether the broken motor system is capable of generating the counter-electromotive force, the motor system control apparatus 20 may confirm a damage region of the broken motor system, and may confirm whether the damage region is a damage region in which generation of the counter-electromotive force is impossible.

Here, when confirming whether the damage region is a damage region in which generation of the counter-electromotive force is impossible, the motor system control apparatus 20 may confirm whether the damage is damage to the motor configured to generate the counter-electromotive force or damage to the inverter, and may recognize that the damage region is a damage region in which generation of the counter-electromotive force is impossible in the case in which the damage is damage to the motor configured to generate the counter-electromotive force or damage to the inverter.

When confirming whether the broken motor system is capable of generating the counter-electromotive force, however, the motor system control apparatus 20 may finish control of the broken motor system in the case in which it is possible to generate the counter-electromotive force. When the control of the broken motor system is finished, the motor system 10 may execute a limp-home traveling mode.

Next, when deciding whether to generate the counter-electromotive force, the motor system control apparatus 20 may block a driving control signal that is input to the broken motor system in the case in which the broken motor system is capable of generating the counter-electromotive force, may determine whether it is possible to charge the battery based on the SOC of the vehicle, and may decide whether to generate the counter-electromotive force based on the traveling state of the vehicle in the case in which it is possible to charge the battery.

Here, when blocking the driving control signal that is input to the broken motor system, the motor system control apparatus 20 may block a pulse width modulation (PWM) signal for controlling the inverter of the broken motor system.

In addition, when determining whether it is possible to charge the battery, the motor system control apparatus 20 may determine that it is possible to charge the battery in the case in which the level of the SOC is equal to or less than a normal level based on the SOC of the vehicle, and may determine that it is not possible to charge the battery in the case in which the level of the SOC exceeds the normal level.

When determining whether it is possible to charge the battery, the motor system control apparatus 20 may perform control such that the clutch 16 included in the broken motor system is turned off, whereby the shaft of the motor and the wheel shaft, to which the wheels are connected, are disconnected from each other, upon determining that it is not possible to charge the battery.

In addition, when deciding whether to generate the counter-electromotive force, the motor system control apparatus 20 may confirm whether the speed of the motor is equal to or higher than a reference speed in the case in which the traveling state of the vehicle is descent traveling or coasting traveling, and may decide to generate the counter-electromotive force in the case in which the speed of the motor is equal to or higher than the reference speed.

Here, when confirming whether the speed of the motor is equal to or higher than the reference speed, the motor system control apparatus 20 may decide to block generation of the counter-electromotive force in the case in which the speed of the motor is not equal to or higher than the reference speed, and may perform control such that the clutch 16 included in the broken motor system is turned off, whereby the shaft of the motor and the wheel shaft, to which the wheels are connected, are disconnected from each other, upon determining that it is not possible to charge the battery.

As an example, the reference speed may be the minimum speed necessary for the motor to generate the counter-electromotive force; however, the present disclosure is not limited thereto.

Next, when controlling the broken motor system, the motor system control apparatus 20 may control the broken motor system such that the clutch 16 included in the broken motor system is turned on, whereby the shaft of the motor and the wheel shaft, to which the wheels are connected, are connected to each other, upon deciding to generate the counter-electromotive force.

Subsequently, when charging the battery, the motor system control apparatus 20 may confirm whether the speed of the motor enters a critical speed in the case in which the counter-electromotive force of the motor 18 is generated, and may charge the battery with electrical energy generated by the counter-electromotive force of the motor 18 in the case in which the speed of the motor does not enter the critical speed.

Here, when the speed of the motor enters the critical speed, the motor system control apparatus 20 may perform control such that the clutch 16 included in the broken motor system is turned off, whereby the shaft of the motor 18 and the wheel shaft, to which the wheels are connected, are disconnected from each other.

In the case in which the DAS is applied to each of the front wheel motor system 12 and the rear wheel motor system 14, the present disclosure may apply the motor system control logic, as described above, when one of the front wheel motor system 12 and the rear wheel motor system 14 is broken.

Depending on circumstances, in the case in which the DAS is applied only to the front wheel motor system 12, the present disclosure may apply the motor system control logic, as described above, only when the front wheel motor system 12 is broken.

That is, in the case in which the DAS is applied only to the front wheel motor system 12, the vehicle may travel in the limp-home traveling mode using the rear wheel motor system 14 alone when the front wheel motor system 12 is broken.

At this time, the DAS may be controlled differently depending on the following level of the SOC.

As another case, in the case in which the DAS is applied only to the rear wheel motor system 14, the present disclosure may apply the motor system control logic, as described above, only when the rear wheel motor system 14 is broken.

In the case in which the level of the SOC is equal to or less than an intermediate level, the present disclosure may perform control such that the clutch 16 of the DAS of the front wheel motor system 12 is turned on, whereby it is possible to use energy generated at a place where descent traveling or coasting traveling over a long distance is possible.

Here, in the case in which the clutch 16 of the DAS of the front wheel motor system 12 is turned on, the wheels connected to the clutch 16 of the DAS are rotated to rotate the motor 18 when the vehicle is driven at a uniform speed, and, at this time, counter-electromotive force equal to or higher than the voltage of the battery is generated.

At this time, in the case in which the speed of the motor based on the driving speed of the vehicle is calculated backwards and a motor speed reference value at which counter-electromotive force can be generated is applied when developing the vehicle, control may be performed such that the clutch 16 of the DAS is turned on based on the motor speed reference value.

The battery is charged with the energy generated by the counter-electromotive force through a diode of the inverter.

In the case in which the clutch 16 of the DAS may be kept on during traveling of the vehicle, however, this may act as load during usual rear-wheel traveling. Consequently, only in a regenerative braking state.

In this case, the effect of reducing differential gear and motor drag loss may be achieved.

Also, in the case in which the level of the SOC is a high level, charging of energy due to regenerative braking may overcharge the main high-voltage battery in the state in which the SOC is full due to a continuous descent traveling condition or other similar traveling conditions in a mountain region. Consequently, the present disclosure may apply logic capable of controlling the clutch 16 of the DAS to be turned off in the case in which the level of the SOC is equal to or higher than a predetermined level.

In the present disclosure, as described above, it is possible to generate counter-electromotive force of the broken motor system based on the SOC and the traveling state of the vehicle and to charge the battery with electrical energy generated by the counter-electromotive force, whereby it is possible to increase the traveling distance in the limp-home traveling mode utilizing the broken motor system.

That is, in the present disclosure, it is possible to achieve the effect of increasing the traveling distance in the limp-home traveling mode using the broken motor system including the motor and the inverter.

Also, in the present disclosure, it is possible to prevent the main battery from being overcharged using the logic configured to determine the level of the SOC.

Also, in the present disclosure, it is possible to determine the critical speed of the motor, whereby it is possible to prevent the controller from burning out due to high counter-electromotive force.

Also, the present disclosure may be realized only using software logic without additional devices.

Figure 3:
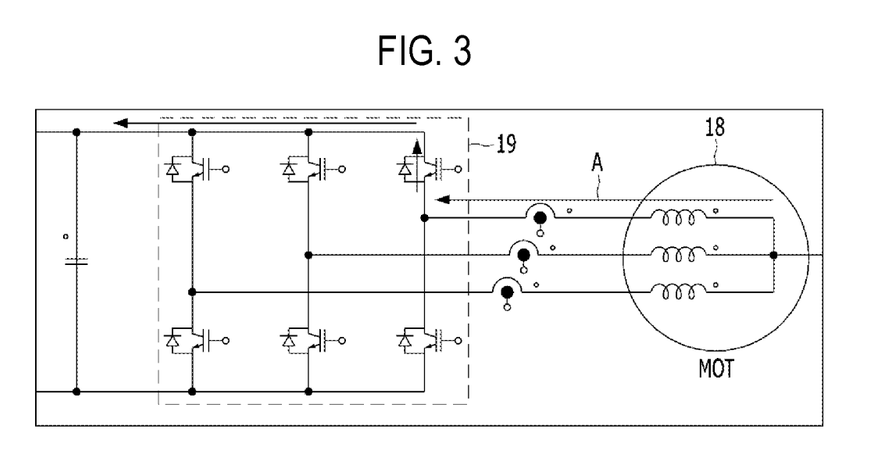
FIG. 3 is a circuit diagram illustrating charging of a battery using counter-electromotive force.
Figure 4:
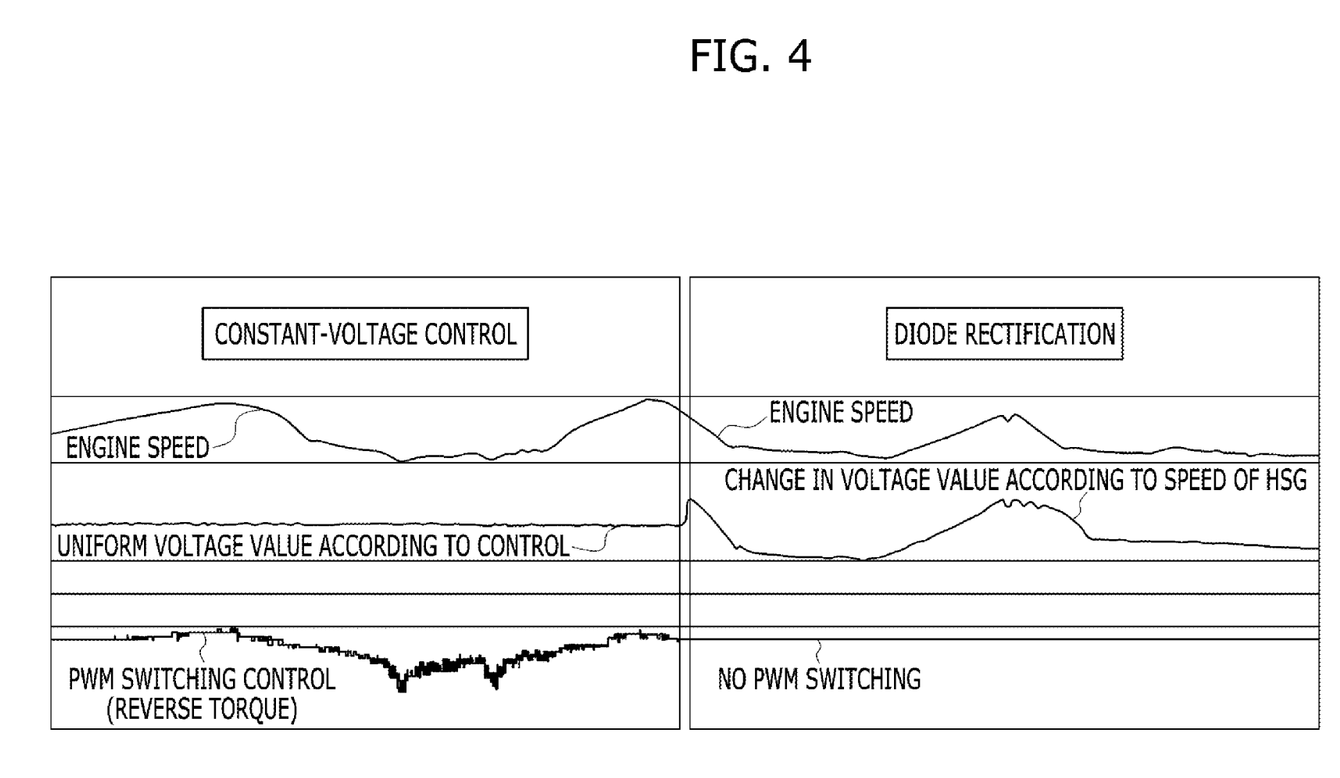
FIG. 4 is a graph illustrating generation of electrical energy using counter-electromotive force of a motor.

FIG. 3 is a circuit diagram illustrating charging of a battery using counter-electromotive force, and FIG. 4 is a graph illustrating generation of electrical energy using counter-electromotive force of a motor.

The logic of the present disclosure is a concept different from regenerative braking, which converts counter-electromotive force into electrical energy through PWM switching control and performs braking in a normal motor system. In the logic of the present disclosure, the battery is charged under specific conditions using counter-electromotive force generated when a motor is rotated in a broken motor system, whereby it is possible to increase the traveling distance in the limp-home traveling mode utilizing the broken motor system.

In addition, the logic of the present disclosure may be applied to the case in which the motor system is broken due to breakdown of the MCU, breakdown depending on excess of a current control error, U-shaped breakdown of the current sensor, V-shaped breakdown of the current sensor, breakdown depending on over-temperature caused by control, etc.

Here, breakdown of the motor system includes breakdown of the motor and the inverter. For example, breakdown of the motor due to over-temperature may correspond to breakdown of the motor, and breakdown of a switch transistor due to over-temperature or breakdown of the current sensor of the inverter may correspond to breakdown of the inverter.

Therefore, the logic of the present disclosure may be applied only a few breakdowns capable of generating counter-electromotive force, among the breakdowns of the motor and the inverter.

Consequently, the present disclosure may monitor operation states of the motor systems including the front wheel motor system and the rear wheel motor system, and may recognize breakdown of each motor system based on the operation states.

Here, the present disclosure may recognize breakdown of the motor system due to the motor in the case in which the operation state of the motor system is over-temperature of the motor, and recognize breakdown of the motor system due to the inverter in the case in which the operation state of the motor system is over-temperature of the switch of the inverter, excess of a current control error, or damage to the current sensor.

In addition, the present disclosure may recognize that the broken motor system is capable of generating counter-electromotive force in the case in which the clutch of the DAS is applied to the broken motor system, and may recognize that the broken motor system is not capable of generating counter-electromotive force in the case in which the clutch of the DAS is not applied to the broken motor system.

Subsequently, upon recognizing that the broken motor system is capable of generating counter-electromotive force, the present disclosure may control the clutch of the DAS based on the SOC, which is a first condition, and the speed of the motor, which is a second condition.

That is, the present disclosure may determine whether it is possible to charge the battery based on the SOC. The present disclosure may determine that it is possible to charge the battery in the case in which the level of the SOC is equal to or less than a normal level, and may determine that it is not possible to charge the battery in the case in which the level of the SOC exceeds the normal level.

In addition, the present disclosure may control on/off of the clutch of the DAS based on the speed of the motor.

That is, the present disclosure may control the clutch of the DAS to be turned on in order to charge the battery using counter-electromotive force of the motor in the case in which the speed of the motor is equal to or higher than a reference speed, and may control the clutch of the DAS to be turned off in order to reduce load in the case in which the speed of the motor is lower than the reference speed.

In addition, the present disclosure may control the clutch of the DAS to be turned off in order to reduce load in the case in which the speed of the motor enters a critical speed, and may charge the battery with electrical energy generated by the counter-electromotive force of the motor in the case in which the speed of the motor does not enter the critical speed.

In the case in which the clutch of the DAS of the broken motor system is turned on, as shown in FIG. 3, the wheels connected to the clutch of the DAS are rotated to rotate the motor 18 when the vehicle is driven at a uniform speed, and, at this time, counter-electromotive force equal to or higher than the voltage of the battery is generated.

Consequently, electrical energy A generated by the counter-electromotive force of the motor 18 may flow toward the battery via the diode of the inverter 19 to charge the battery, since the switches of the inverter 19 are not controlled.

When rotated a predetermined number of times or more by external force, the motor acts as a generator, whereby counter-electromotive force is generated.

Here, the motor system may perform constant-voltage control capable of controlling the voltage of the counter-electromotive force that comes over through PWM switching in the case in which the inverter is normal.

In the case in which the inverter is broken, however, the motor system may rectify the diode only using counter-electromotive force based on the rotation of the motor, since the motor system cannot perform constant-voltage control.

Here, the counter-electromotive force of the motor is set for each number of rotations depending on design specifications, such as the density of a magnet. When the motor is rotated a predetermined number of times, counter-electromotive force higher than the voltage of the battery is generated, whereby current generated by the counter-electromotive force may come to the battery via the diode without switching of the inverter such that the battery is charged with the current generated by the counter-electromotive force.

In diode rectification using the counter-electromotive force, therefore, the counter-electromotive force of the motor may be changed depending on the speed of an engine, and the voltage of a capacitor may be changed in proportion to the number of rotations of the engine. In the case in which the voltage of the capacitor is higher than the voltage of the battery, the battery may be charged.

As shown in FIG. 4, in constant-voltage control, a hybrid starter generator (HSG) may control uniform voltage through PWM switching control using rotational force generated by the engine.

In contrast, it can be seen that, in diode rectification according to the logic of the present disclosure, a voltage pattern using only counter-electromotive force is provided.

That is, it can be seen that, in diode rectification according to the present disclosure, PWM switching control is not performed, and therefore voltage generated by counter-electromotive force increases when the speed of the engine increases.

In the present disclosure, therefore, it is possible to generate counter-electromotive force of the broken motor system based on the state of charge (SOC) and the traveling state of the vehicle and to charge the battery with electrical energy generated by the counter-electromotive force, whereby it is possible to increase the traveling distance in the limp-home traveling mode utilizing the broken motor system.

Figure 5:
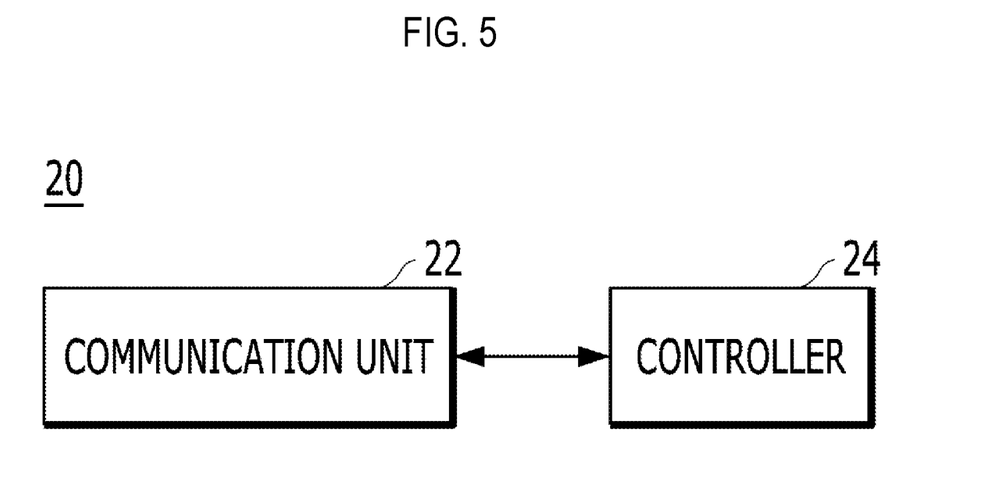
FIG. 5 is a block diagram illustrating a motor system control apparatus according to an embodiment of the present disclosure.

FIG. 5 is a block diagram illustrating a motor system control apparatus according to an embodiment of the present disclosure.

As shown in FIG. 5, the motor system control apparatus 20 according to the present disclosure may include a communication unit 22 communicatively connected to a plurality of motor systems and a controller 24 configured to control the motor system such that the battery is charged using counter-electromotive force of the motor upon recognizing that the motor system is broken through the communication unit 22.

Here, the communication unit 22 may be communicatively connected to the controllers of the front wheel motor system and the rear wheel motor system, which are included in the motor systems.

The controller 24 may confirm whether, upon recognizing breakdown of the motor system, the broken motor system is capable of generating counter-electromotive force, may decide whether to generate the counter-electromotive force based on the state of charge (SOC) and the traveling state of the vehicle upon confirming that the broken motor system is capable of generating the counter-electromotive force, may control the broken motor system such that the counter-electromotive force of the motor is generated upon deciding to generate the counter-electromotive force, and may charge the battery with electrical energy generated by the counter-electromotive force of the motor.

Here, when recognizing breakdown of the motor system, the controller 24 may monitor operation states of the motor systems, and may recognize breakdown of each motor system based on the operation states.

As an example, when recognizing breakdown of the motor system, the controller 24 may recognize breakdown of the motor system due to the motor in the case in which the operation state of the motor system is over-temperature of the motor.

As another example, when recognizing breakdown of the motor system, the controller 24 may recognize breakdown of the motor system due to the inverter in the case in which the operation state of the motor system is over-temperature of the switch of the inverter, excess of a current control error, or damage to the current sensor.

In addition, when confirming whether the broken motor system is capable of generating the counter-electromotive force, the controller 24 may confirm whether the clutch configured to perform connection/disconnection between the shaft of the motor and the wheel shaft, to which the wheels are connected, is included in the broken motor system, and may confirm whether the broken motor system is capable of generating the counter-electromotive force upon confirming that the clutch is included.

Here, when confirming that the clutch is included, however, the controller 24 may finish control of the broken motor system in the case in which the clutch is not included. When control of the broken motor system is finished, the motor system may execute a limp-home traveling mode.

In addition, when confirming whether the broken motor system is capable of generating the counter-electromotive force, the controller 24 may confirm a damage region of the broken motor system, and may confirm whether the damage region is a damage region in which generation of the counter-electromotive force is impossible.

Here, when confirming whether the damage region is a damage region in which generation of the counter-electromotive force is impossible, the controller 24 may confirm whether the damage is damage to the motor configured to generate the counter-electromotive force or damage to the inverter, and may recognize that the damage region is a damage region in which generation of the counter-electromotive force is impossible in the case in which the damage is damage to the motor configured to generate the counter-electromotive force or damage to the inverter.

In addition, when confirming whether the broken motor system is capable of generating the counter-electromotive force, however, the controller 24 may finish control of the broken motor system in the case in which it is possible to generate the counter-electromotive force. When the control of the broken motor system is finished, the motor system may execute the limp-home traveling mode.

Subsequently, when deciding whether to generate the counter-electromotive force, the controller 24 may block a driving control signal that is input to the broken motor system in the case in which the broken motor system is capable of generating the counter-electromotive force, may determine whether it is possible to charge the battery based on the SOC of the vehicle, and may decide whether to generate the counter-electromotive force based on the traveling state of the vehicle in the case in which it is possible to charge the battery.

Here, when blocking the driving control signal that is input to the broken motor system, the controller 24 may block a pulse width modulation (PWM) signal for controlling the inverter of the broken motor system.

In addition, when determining whether it is possible to charge the battery, the controller 24 may determine that it is possible to charge the battery in the case in which the level of the SOC is equal to or less than a normal level based on the SOC of the vehicle, and may determine that it is not possible to charge the battery in the case in which the level of the SOC exceeds the normal level.

Here, when determining whether it is possible to charge the battery, the controller 24 may turn off the clutch included in the broken motor system such that the shaft of the motor and the wheel shaft, to which the wheels are connected, are disconnected from each other upon determining that it is not possible to charge the battery.

In addition, when deciding whether to generate the counter-electromotive force, the controller 24 may confirm whether the speed of the motor is equal to or higher than a reference speed in the case in which the traveling state of the vehicle is descent traveling or coasting traveling, and may decide to generate the counter-electromotive force in the case in which the speed of the motor is equal to or higher than the reference speed.

Here, when confirming whether the speed of the motor is equal to or higher than the reference speed, the controller 24 may decide to block generation of the counter-electromotive force in the case in which the speed of the motor is not equal to or higher than the reference speed, and may turn off the clutch included in the broken motor system such that the shaft of the motor and the wheel shaft, to which the wheels are connected, are disconnected from each other upon determining that it is not possible to charge the battery.

As an example, the reference speed may be the minimum speed necessary for the motor to generate the counter-electromotive force.

Next, when controlling the broken motor system, the controller 24 may control the broken motor system such that the clutch included in the broken motor system is turned on, whereby the shaft of the motor and the wheel shaft, to which the wheels are connected, are connected to each other, upon deciding to generate the counter-electromotive force.

Subsequently, when charging the battery, the controller 24 may confirm whether the speed of the motor enters a critical speed in the case in which the counter-electromotive force of the motor is generated, and may charge the battery with electrical energy generated by the counter-electromotive force of the motor in the case in which the speed of the motor does not enter the critical speed.

Here, when the speed of the motor enters the critical speed, the controller 24 may turn off the clutch included in the broken motor system such that the shaft of the motor and the wheel shaft, to which the wheels are connected, are disconnected from each other.

Figure 6:
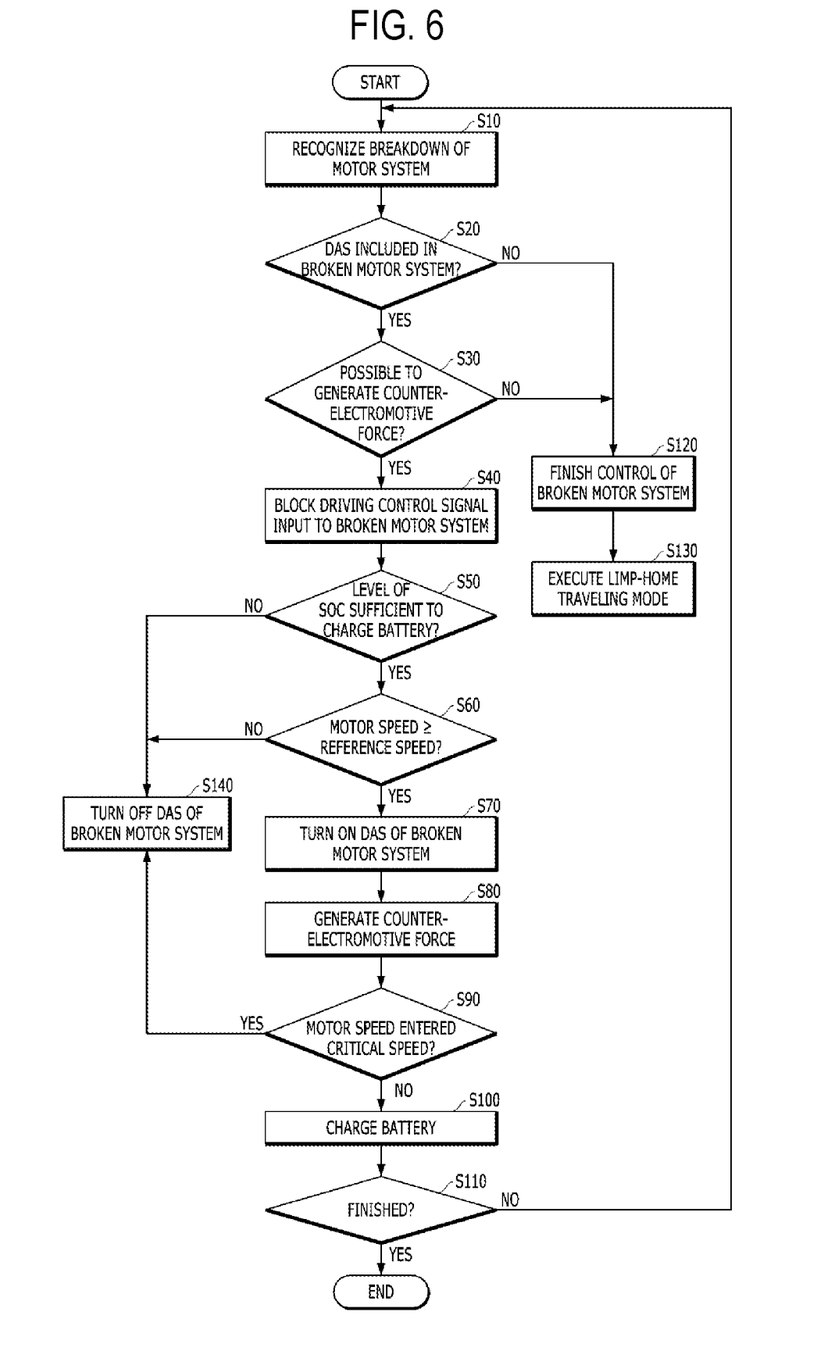
FIG. 6 is a flowchart illustrating a motor system control method of a motor system control apparatus according to an embodiment of the present disclosure.

FIG. 6 is a flowchart illustrating a motor system control method of a motor system control apparatus according to an embodiment of the present disclosure.

As shown in FIG. 6, a controller of the present disclosure may recognize breakdown of a motor system (S10).

Here, the controller may monitor operation states of a plurality of motor systems, and may recognize breakdown of each motor system based on the operation states.

In addition, the controller may confirm whether a DAS having a clutch configured to perform connection/disconnection between a shaft of a motor and a wheel shaft, to which wheels are connected, is included in the broken motor system (S20).

Here, in the case in which the DAS is not included, the controller may finish control of the broken motor system (S120), and a vehicle may execute a limp-home traveling mode using a normal one of the motor systems (S130).

Subsequently, in the case in which the DAS is included, the controller may confirm whether the broken motor system is capable of generating counter-electromotive force (S30).

Here, in the case in which it is not possible to generate the counter-electromotive force, the controller may finish control of the broken motor system (S120), and the vehicle may execute the limp-home traveling mode using a normal one of the motor systems (S130).

Next, in the case in which the broken motor system is capable of generating the counter-electromotive force, the controller may block a driving control signal that is input to the broken motor system (S40).

Here, the controller may block a pulse width modulation (PWM) signal for controlling an inverter of the broken motor system.

In addition, the controller may determine whether the level of the SOC is a level at which it is possible to charge the battery based on the SOC of the vehicle (S50).

Here, the controller may determine that it is possible to charge the battery in the case in which the level of the SOC is equal to or less than a normal level, and may determine that it is not possible to charge the battery in the case in which the level of the SOC exceeds the normal level.

At this time, upon determining that the level of the SOC is a level at which it is not possible to charge the battery, the controller may control the broken motor system such that the DAS included in the broken motor system is turned off, whereby the shaft of the motor and the wheel shaft, to which the wheels are connected, are disconnected from each other (S140).

Next, upon determining that the level of the SOC is a level at which it is possible to charge the battery, the controller may confirm whether the speed of the motor is equal to or higher than a reference speed (S60).

Subsequently, in the case in which the speed of the motor is equal to or higher than the reference speed, the controller may control the broken motor system such that the DAS included in the broken motor system is turned on, whereby the shaft of the motor and the wheel shaft, to which the wheels are connected, are connected to each other (S70).

Here, in the case in which the speed of the motor is not equal to or higher than the reference speed, the controller may control the broken motor system such that the DAS included in the broken motor system is turned off, whereby the shaft of the motor and the wheel shaft, to which the wheels are connected, are disconnected from each other (S140).

In addition, the controller may control the broken motor system such that counter-electromotive force of the motor is generated (S80).

Next, when the counter-electromotive force of the motor is generated, the controller may confirm whether the speed of the motor enters a critical speed (S90).

Subsequently, in the case in which the speed of the motor does not enter the critical speed, the controller may charge the battery with electrical energy generated by the counter-electromotive force of the motor (S100).

Here, when the speed of the motor enters the critical speed, the controller may control the broken motor system such that the DAS included in the broken motor system is turned off, whereby the shaft of the motor and the wheel shaft, to which the wheels are connected, are disconnected from each other (S140).

In addition, the controller may confirm whether there is a request for finishing control of the motor system (S110), and may finish the above control process in the case in which there is a request for finishing control of the motor system.

Meanwhile, a computer-readable recording medium containing a program for performing the motor system control method of the motor system control apparatus for vehicles according to the present disclosure may execute the processes included in the motor system control method of the motor system control apparatus for vehicles.

In the motor system control apparatus for vehicles and the motor system control method thereof according to at least one embodiment of the present disclosure, constructed as described above, it is possible to generate counter-electromotive force of the broken motor system based on the SOC and the traveling state of the vehicle and to charge the battery with electrical energy generated by the counter-electromotive force, whereby it is possible to increase the traveling distance in the limp-home traveling mode utilizing the broken motor system.

That is, in the present disclosure, it is possible to achieve the effect of increasing the traveling distance in the limp-home traveling mode using the broken motor system including the motor and the inverter.

Also, in the present disclosure, it is possible to prevent the main battery from being overcharged using the logic configured to determine the level of the SOC.

Also, in the present disclosure, it is possible to determine the critical speed of the motor, whereby it is possible to prevent the controller from burning out due to high counter-electromotive force.

Also, the present disclosure may be realized only using software logic without additional devices.

It will be appreciated by those skilled in the art that the effects achievable through the present disclosure are not limited to those that have been particularly described hereinabove and that other effects of the present disclosure will be more clearly understood from the above detailed description.

The motor system control method according to the present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

The above detailed description is not to be construed as limiting the present disclosure in any aspect, but is to be considered by way of example. The scope of the present disclosure should be determined by reasonable interpretation of the accompanying claims, and all equivalent modifications made without departing from the scope of the present disclosure should be understood as being included in the following claims.

The invention claimed is:

1. A motor system control apparatus for vehicles, the motor system control apparatus comprising:
a communication unit communicatively connected to a plurality of motor systems; and
a controller configured to, upon recognizing that one of the motor systems is broken through the communication unit, control the motor system such that a battery is charged using counter-electromotive force of a motor, wherein:
the controller confirms whether, upon recognizing breakdown of the motor system, the broken motor system is capable of generating counter-electromotive force, decides whether to generate the counter-electromotive force based on a state of charge (SOC) and a traveling state of a vehicle upon confirming that the broken motor system is capable of generating the counter-electromotive force, controls the broken motor system such that the counter-electromotive force of the motor is generated upon deciding to generate the counter-electromotive force, and charges the battery with electrical energy generated by the counter-electromotive force of the motor.

2. The motor system control apparatus according to claim 1, wherein the motor systems comprise a front wheel motor system and a rear wheel motor system of a vehicle.

3. The motor system control apparatus according to claim 1, wherein at least one of the motor systems comprises a clutch configured to perform connection/disconnection between a shaft of the motor and a wheel shaft, to which wheels are connected.

4. The motor system control apparatus according to claim 1, wherein, when recognizing breakdown of the motor system, the controller monitors operation states of the motor systems, and recognizes breakdown of each motor system based on the operation states.

5. The motor system control apparatus according to claim 1, wherein, when confirming whether the broken motor system is capable of generating the counter-electromotive force, the controller confirms whether a clutch configured to perform connection/disconnection between a shaft of the motor and a wheel shaft, to which wheels are connected, is included in the broken motor system, and confirms whether the broken motor system is capable of generating the counter-electromotive force upon confirming that the clutch is included.

6. The motor system control apparatus according to claim 5, wherein, when confirming whether the broken motor system is capable of generating the counter-electromotive force, the controller confirms a damage region of the broken motor system, and confirms whether the damage region is a damage region in which generation of the counter-electromotive force is impossible.

7. The motor system control apparatus according to claim 1, wherein, when deciding whether to generate the counter-electromotive force, the controller blocks a driving control signal that is input to the broken motor system in a case in which the broken motor system is capable of generating the counter-electromotive force, determines whether charging of the battery is possible based on the SOC of the vehicle, and decides whether to generate the counter-electromotive force based on the traveling state of the vehicle in a case in which charging of the battery is possible.

8. The motor system control apparatus according to claim 7, wherein, when determining whether charging of the battery is possible, the controller determines that charging of the battery is possible in a case in which a level of the SOC is equal to or less than a normal level based on the SOC of the vehicle, and determines that charging of the battery is not possible in a case in which the level of the SOC exceeds the normal level.

9. The motor system control apparatus according to claim 7, wherein, when deciding whether to generate the counter-electromotive force, the controller confirms whether a speed of the motor is equal to or higher than a reference speed, and decides to generate the counter-electromotive force in a case in which the speed of the motor is equal to or higher than the reference speed.

10. The motor system control apparatus according to claim 1, wherein, when controlling the broken motor system, the controller controls the broken motor system such that a clutch included in the broken motor system is turned on, whereby a shaft of the motor and a wheel shaft, to which wheels are connected, are connected to each other, upon deciding to generate the counter-electromotive force.

11. The motor system control apparatus according to claim 1, wherein,
when charging the battery, the controller confirms whether a speed of the motor enters a critical speed in a case in which the counter-electromotive force of the motor is generated, and charges the battery with electrical energy generated by the counter-electromotive force of the motor in a case in which the speed of the motor does not enter the critical speed.

12. A motor system control method of a motor system control apparatus for vehicles comprising a controller communicatively connected to a plurality of motor systems to control a broken motor system, the motor system control method comprising:
the controller recognizing breakdown of the motor system;
the controller confirming whether the broken motor system is capable of generating counter-electromotive force;
the controller deciding whether to generate the counter-electromotive force based on a state of charge (SOC) and a traveling state of a vehicle upon confirming that the broken motor system is capable of generating the counter-electromotive force;
the controller controlling the broken motor system such that counter-electromotive force of a motor is generated upon deciding to generate the counter-electromotive force; and
the controller charging a battery with electrical energy generated by the counter-electromotive force of the motor.

13. The motor system control method according to claim 12, wherein the recognizing breakdown of the motor system comprises monitoring operation states of the motor systems and recognizing breakdown of each motor system based on the operation states.

14. The motor system control method according to claim 12, wherein the confirming whether the broken motor system is capable of generating counter-electromotive force comprises:
confirming whether a clutch configured to perform connection and disconnection between a shaft of the motor and a wheel shaft, to which wheels are connected, is included in the broken motor system; and
confirming whether the broken motor system is capable of generating the counter-electromotive force upon confirming that the clutch is included.

15. The motor system control method according to claim 12, wherein the deciding whether to generate the counter-electromotive force comprises:
blocking a driving control signal that is input to the broken motor system in a case in which the broken motor system is capable of generating the counter-electromotive force;
determining whether charging of the battery is possible based on the SOC of the vehicle; and
deciding whether to generate the counter-electromotive force based on the traveling state of the vehicle in a case in which charging of the battery is possible.

16. The motor system control method according to claim 15, wherein the determining whether charging of the battery is possible comprises determining that charging of the battery is possible in a case in which a level of the SOC is equal to or less than a normal level based on the SOC of the vehicle and determining that charging of the battery is not possible in a case in which the level of the SOC exceeds the normal level.

17. The motor system control method according to claim 15, wherein the deciding whether to generate the counter-electromotive force comprises confirming whether a speed of the motor is equal to or higher than a reference speed and deciding to generate the counter-electromotive force in a case in which the speed of the motor is equal to or higher than the reference speed.

18. The motor system control method according to claim 12, wherein the controlling the broken motor system comprises controlling the broken motor system such that a clutch included in the broken motor system is turned on, whereby a shaft of the motor and a wheel shaft, to which wheels are connected, are connected to each other, upon deciding to generate the counter-electromotive force.

19. A computer-readable recording medium containing a program for performing the method according to claim 12.

20. A vehicle comprising:
a plurality of motor systems; and
a motor system control apparatus communicatively connected to the motor systems to control a broken motor system, wherein the motor system control apparatus comprises:
a communication unit communicatively connected to the motor systems; and
a controller configured to confirm whether, upon recognizing breakdown of the motor system, the broken motor system is capable of generating counter-electromotive force, to decide whether to generate the counter-electromotive force based on a state of charge (SOC) and a traveling state of a vehicle upon confirming that the broken motor system is capable of generating the counter-electromotive force, to control the broken motor system such that counter-electromotive force of a motor is generated upon deciding to generate the counter-electromotive force, and to charge a battery with electrical energy generated by the counter-electromotive force of the motor.

* * * * *